Oct. 24, 1967   F. ELLROTT ET AL   3,348,467
STOCK FEED PELLETING MACHINE
Filed Aug. 17, 1966
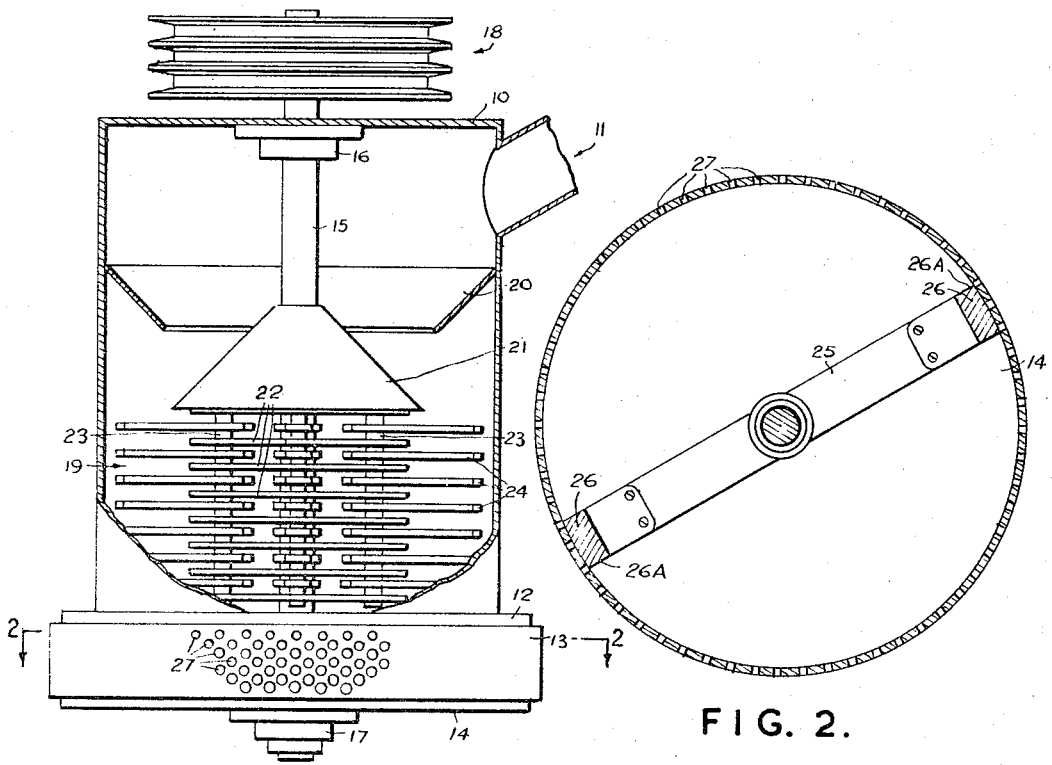
FIG. 1.
FIG. 2.
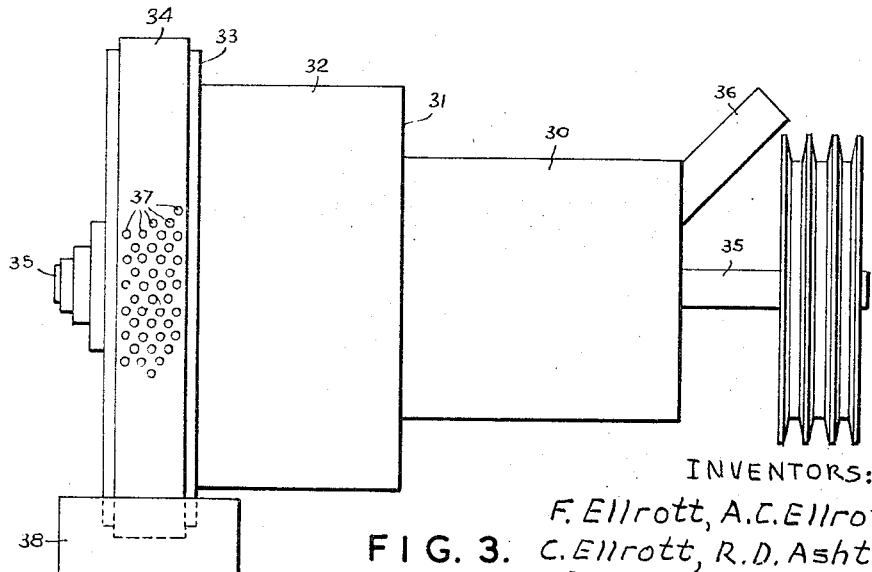
FIG. 3.
INVENTORS:
F. Ellrott, A.C. Ellrott,
C. Ellrott, R.D. Ashton,
D.H. Ashton and
E.S. Gomersall
BY
Richards & Geier
ATTORNEYS

United States Patent Office 3,348,467
Patented Oct. 24, 1967

3,348,467
STOCK FEED PELLETING MACHINE
Frederick Ellrott, Albert C. Ellrott, and Charles Ellrott, all of Sleipner Junction, Rockhampton, Queensland, Australia; Roy D. Ashton, 94 Bremer St., North Rockhampton, Queensland, Australia; and Douglas H. Ashton, Elphinstone St., and Ernest S. Gomersall, 6 Cavell St., both of Rockhampton, Queensland, Australia
Filed Aug. 17, 1966, Ser. No. 573,111
9 Claims. (Cl. 99—235)

ABSTRACT OF THE DISCLOSURE

A pelleting machine for green stock feed includes a cylindrical apertured plate, a radial arm rotatable about the axis of the plate and a blade on the arm moving closely adjacent said plate. The axial width of arm and blade is substantially equal to the axial width of the plate and the leading face of said blade is substantially radial.

---

This invention relates to a machine for pelleting stockfeed.

The machine is particularly designed for producing stock feed pellets in accordance with a process in which the outer coating of a green crop is broken up while retaining the plant juices, and the broken up matrix is formed into pellets, again without expressing the juices.

The present machine may provide a compact arrangement in which the macerating (breaking up) of the green crop and the pelleting of the broken up matrix are both performed efficiently.

An object of the invention is to pellet macerated green feed in a simple and effective manner, to enable large quantities of green crop to be pelleted quickly, and to accomplish the pelleting without appreciable loss of plant juices.

Broadly, the invention comprises a pelleting machine including a pelleting chamber peripherally bounded by a cylindrical apertured plate, an arm within said chamber and rotatable about the axis of said plate, a blade on the outer extremity of said arm, the axial width of said arm and said blade being substantially equal to the axial length of said plate, the leading edge of the outer end of said blade moving closely adjacent the inner face of said plate and the leading face of said blade being substantially radial and means for feeding material to be pelleted to said chamber.

Preferably, a macerator is rotatably mounted on the shaft driving said arm, the macerator being displaced along the shaft from said chamber and feeding macerated material to it.

Specific exemplary embodiments will now be described with reference to the accompanying drawings in which:

FIGURE 1 shows, partly broken away, a combined macerator and pelleter,

FIGURE 2 shows a section of the pelleting chamber on line 2—2 of FIGURE 1, and

FIGURE 3 shows diagrammatically a modified arrangement.

Referring to FIGURES 1 and 2, the machine comprises a vertical cylindrical casing 10 having an aperture 11 near its top, into which freshly cut green crop may be fed.

Below the casing and co-axial with it is a pelleting chamber 12. This chamber is bounded by a cylindrical apertured plate 13 of somewhat greater diameter than the casing 10 and a closure plate 14 across the bottom.

A shaft 15 passes vertically and co-axially through the casing and the pelleting chamber and is rotatably mounted in top and bottom bearings 16, 17. A drive pulley 18 (or equivalent drive means) are fixed upon the upper end of the shaft where it projects above the casing.

A macerator assembly generally designated 19 is fixed to the shaft within the casing some distance below the feed aperture, and conical baffle plates 20, 21 guide the green feed from the aperture to the outer periphery of this assembly.

The assembly 19 comprises a series of vertically spaced radial arms 22 secured to the shaft 15 and having vertical rods 23 spaced from the shaft passing through them.

Thresher blades 24 are pivoted towards their inner ends on these rods between each adjacent pair of the arms 22, the outer ends of the blades extend within a short distance of the casing walls. When rotated, the blades 24 fly outwards by centrifugal force.

Fixed to the shaft within the pelleting chamber are radial arms 25 each having a pelleting blade 26 on its end. The combined length of each arm 25 and blade 26 is such that leading edge of the outer face of the blade 26 passes closely over the inner face of the apertured plate 13 bounding the pelleting chamber, the leading face of blade 26 being substantially radial.

Each pelleting blade is wide enough vertically to pass over all the apertures 27 in the plate 13 and is preferably of substantial width horizontally as indicated in FIG. 2. Its outer face is planar, or curved with the same radius of curvature as the apertured plate 13. Each blade moves over the inner surface of the plate with very little clearance. It will be obvious that a single arm 25 and blade 26 may be used instead of the two shown, or that more than two such arms and blades, preferably symmetrically located, may be used.

The shape and dispositions of the apertures 27 in the plate 13 may vary according to requirements. For small pellets, circular holes (FIG. 1) in rows round the cylindrical plate 13, the holes in adjacent rows being staggered and the spacing between rows being slightly greater than their radius, has been found satisfactory.

In operation the shaft 15 is rotated by a power source, which for example may be a small motor mounted by a bracket on the assembly, or the power take-off of a tractor.

Freshly cut green feed is fed through the opening 11, is guided inwards by cone 20 to cone 21 and is fed to the periphery of the macerator assembly 19. Cone 21 prevents the feed material reaching and clogging the more central arms 22 and rods 23 of the assembly. The material is macerated by blades 24 and the matrix passes by gravity into chamber 12. The arms 25 collect the matrix and give it a swift rotatory motion in chamber 12, whereby it is forced radially outward by centrifugal action and passed through the holes 27 in plate 13 to form pellets. Blades 26 pass with only a few hundredths of a centimetre clearance over the inner surface of plate 13 and serve to scrape away any fibrous matter tending to block the holes 27.

It will be noted that, since the blade moves tangentially and very close to the plate at all times, and its leading edge 26A is substantially radial, there is no squeezing or grinding action and consequently the plant juices are not expressed from the matrix to any extent, the blades 26 and arm 25 owing to their axial width, urge the whole matrix round and clear the holes from blockage. Centrifugal force on the rotating matrix forms the pellets.

Since the pellets are formed of wet material with little strength, they will drop off from the plate under their own weight to give a fairly regular size of pellet. Alternatively they may be positively chopped off at intervals.

The pellets may be allowed to drop to the ground to dry and in dried condition be collected by a pneumatic collector, or they may be collected beneath the pelleting chamber and conveyed elsewhere for drying either naturally or by hot air.

The machine described is simple and of small size and weight, so that it lends itself to mobile use, either mounted on a crop harvester or as a separate unit.

FIGURE 3 shows diagrammatically a view of a modified arrangement, in which the green feed passes horizontally to the macerator and pelleter.

A cylindrical feed chamber 30 leads via a step 31 to a somewhat larger macerating chamber 32, which in turn leads via step 33 to a still larger pelleting chamber 34. A drive shaft 35 passes co-axially through all three chambers. Raw green feed, preferably in chopped form, is supplied to feed chamber 30 by a suitable shute 36, an air blast (not shown) may urge the material down shute 36. The material eventually passes over step 31 to chamber 32. Feed means such as a helical blade (not shown) may be driven by shaft 35 in chamber 30 to urge the green feed to the left in the drawing. However, even without such feed means, the green feed as it collects will pass to chamber 32.

Within chamber 32, a macerating assembly (not shown) similar to that at 19 in FIGURE 1, is rotated by shaft 35. As the material is macerated it builds up against step 31, which prevents it moving back to chamber 30, and is gradually fed to pelleting chamber 34 over step 33.

Chamber 34 has radial holes 37 in its wall and corresponds generally to chamber 13 of FIGURES 1 and 2, having pelleting arms and blades (not shown) corresponding to arms and blades 25, 26 of FIGURE 1. Pellets are centrifugally forced out of holes 37 (as before described) and may be collected in a tray 38.

In this arrangement the shaft 35 being horizontal is easier to drive. The stepped construction ensures in a simple manner that the green feed material passes continuously from feed shute 36 to pelleting chamber 34.

Various minor changes may be made in the arrangements described, for instance:

The apertured pelleting plates may be made of various gauges, thus giving different lengths to the pelleting holes. Alternatively a short pipe-like extension outside each hole may be provided to give still greater length.

The cylindrical pelleting plate itself may be made removable, with a series of plates provided with differing arrangements, any one of which may be attached according to the type of feed, size of pellet or other conditions desired.

The speed of rotation of the macerator blade may differ from that of the pelleting blade or blades, as by co-axial drive shafts and a gearing or pulley reduction drive.

The apertured plate may be curved from side to side with corresponding shaping of the pelleting blade if desired. Though the straight cylinder is preferable for simplicity, extra rigidity and strength are obtained for thin plates by such curvature.

The claims defining the invention are as follows:

1. A pelleting machine including a pelleting chamber peripherally bounded by a substantially cylindrical apertured plate, a radial arm within said chamber rotatable about the axis of said plate, a blade on the outer extremity of said arm, the axial widths of said arm and said blade being substantially equal to the axial length of said plate, the leading edge of the outer end of said blade moving closely adjacent the inner face of said plate and the leading face of said blade being substantially radial, and means for feeding material to be pelleted to said chamber.

2. A pelleting machine as claimed in claim 1, including a casing axially displaced from and co-axial with said chamber, a macerating assembly within said casing and rotatable about said axis, and an inlet from said casing to said chamber through which macerated material from said casing is passed to said chamber.

3. A pelleting machine as claimed in claim 2, wherein said assembly and said arm are mounted on a common axial shaft.

4. A pelleting machine as claimed in claim 2 including guide means within said casing guiding material introduced into said casing to the peripheral part of said assembly only.

5. A pelleting machine as claimed in claim 4, in which said guide means include a first conical member extending inwards from the periphery of said casing and a second conical member spaced from said first conical member extending outwardly from said axis.

6. A pelleting machine as claimed in claim 1, in which at least one further similar radial arm and blade is provided, all said arms being symmetrically disposed round said axis.

7. A pelleting machine as claimed in claim 1, in which said apertured plate is removably attached to said chamber.

8. A pelleting machine as claimed in claim 1, in which the axis of said plate is horizontal, a cylindrical macerating chamber of smaller diameter than said plate co-axial with said plate, a cylindrical feed chamber of smaller diameter than said macerating chamber also co-axial with said plate, all three of said chambers being positioned end-to-end, an outward step connecting said feed chamber to said macerating chamber and a second outward step connecting said macerating chamber to said pelleting chamber.

9. A pelleting machine as claimed in claim 8, in which a rotatable shaft passes axially through all three said chambers, said radial arm being attached to said shaft within said pelleting chamber, and a macerating assembly mounted on said shaft in said macerating chamber.

References Cited

UNITED STATES PATENTS 2,970,532   2/1961   Skelton _____ 99—235
3,045,613   7/1962   Kennedy _____ 107—14

FOREIGN PATENTS 1,006,328   1/1954   France.

WALTER A. SCHEEL, *Primary Examiner.*

R. W. JENKINS, *Assistant Examiner.*